United States Patent
Oudin et al.

(10) Patent No.: US 10,934,846 B2
(45) Date of Patent: Mar. 2, 2021

(54) TURBINE ROTOR COMPRISING A VENTILATION SPACER

(71) Applicant: Safran Aircraft Engines, Paris (FR)

(72) Inventors: Benjamin Cyrille Jacques Oudin, Moissy-Cramayel (FR); Pascal Casaliggi, Moissy-Cramayel (FR); Thierry Laurent Capolungo, Moissy-Cramayel (FR); Didier Desire Rene Pasquiet, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 83 days.

(21) Appl. No.: 16/085,408

(22) PCT Filed: Mar. 16, 2017

(86) PCT No.: PCT/FR2017/050614
§ 371 (c)(1),
(2) Date: Sep. 14, 2018

(87) PCT Pub. No.: WO2017/158304
PCT Pub. Date: Sep. 21, 2017

(65) Prior Publication Data
US 2019/0085699 A1 Mar. 21, 2019

(30) Foreign Application Priority Data
Mar. 16, 2016 (FR) ...................... 1652234

(51) Int. Cl.
*F01D 5/08* (2006.01)
*F01D 5/06* (2006.01)
*F01D 11/02* (2006.01)

(52) U.S. Cl.
CPC ............ *F01D 5/082* (2013.01); *F01D 5/066* (2013.01); *F01D 5/088* (2013.01); *F01D 11/02* (2013.01);
(Continued)

(58) Field of Classification Search
CPC .......... F01D 5/066; F01D 5/081; F01D 5/082; F01D 5/087; F01D 5/088; F01D 5/3007;
(Continued)

(56) References Cited

U.S. PATENT DOCUMENTS 4,523,890 A * 6/1985 Thompson ............ F01D 11/006
416/193 A
5,350,278 A * 9/1994 Burge ..................... F01D 5/066
416/198 A (Continued)

FOREIGN PATENT DOCUMENTS

EP  1 091 089 A2  4/2001
EP  1 091 089 A3  12/2003
(Continued)

OTHER PUBLICATIONS

International Search Report dated Jun. 9, 2017, in PCT/FR2017/050614, filed Mar. 16, 2017.
(Continued)

*Primary Examiner* — Courtney D Heinle
*Assistant Examiner* — Elton K Wong
(74) *Attorney, Agent, or Firm* — Oblon, McClelland, Maier & Neustadt, L.L.P.

(57) ABSTRACT

A rotor of a member of a turbomachine, for example a rotor of a turbine, the rotor including a first element, a second element defining with the first element a ventilation cavity, the rotor including a spacer that is introduced and secured between the first element and the second element and that includes a row of through-passages that are configured to permit injection of cooling fluid into the ventilation cavity.

10 Claims, 4 Drawing Sheets

(52) U.S. Cl.
CPC ...... *F05D 2260/20* (2013.01); *F05D 2260/31* (2013.01); *Y02T 50/60* (2013.01)

(58) Field of Classification Search
CPC .... F01D 5/3015; F01D 11/001; F01D 11/005; F01D 11/02; Y02T 50/676; F05D 2260/20; F05D 2260/31
See application file for complete search history.

(56) References Cited

U.S. PATENT DOCUMENTS

| | | | |
|---|---|---|---|
| 6,185,925 B1* | 2/2001 | Proctor | F01D 11/24 415/177 |
| 6,283,712 B1* | 9/2001 | Dziech | F01D 5/066 415/115 |
| 2005/0106028 A1* | 5/2005 | Ahmad | F01D 5/143 416/228 |
| 2008/0112793 A1 | 5/2008 | Lee et al. | |
| 2011/0027103 A1* | 2/2011 | Philippot | F01D 5/081 416/97 R |
| 2012/0121428 A1* | 5/2012 | Belmonte | F01D 5/082 416/220 R |

FOREIGN PATENT DOCUMENTS

| | | |
|---|---|---|
| EP | 1 921 255 A2 | 5/2008 |
| EP | 1 921 255 A3 | 10/2010 |
| FR | 2 978 793 A1 | 2/2013 |
| WO | WO 2005/052321 A1 | 6/2005 |

OTHER PUBLICATIONS

French Search Report dated Dec. 6, 2016 in French Patent Application No. 1652234 (with English translation of Category of Cited Documents), 5 pages.

\* cited by examiner

TURBINE ROTOR COMPRISING A VENTILATION SPACER

FIELD OF THE INVENTION

The invention relates generally to gas turbine engines, and more particularly to the ventilation of the stages of a turbine, for example a low-pressure turbine of a turbomachine. Fields of application of the invention are aircraft turbojets and turboprops and industrial gas turbines.

TECHNICAL BACKGROUND

One example of a turbomachine is illustrated in FIG. 1.

A turbomachine 1 typically comprises a nacelle which forms an opening for the admission of a predetermined flow of air to the engine itself. Conventionally, the gases flow from upstream to downstream through the turbomachine.

Generally, the turbomachine comprises one or more sections 4 for compressing the air admitted into the engine (generally a low-pressure section and a high-pressure section). The air thus compressed is admitted into the combustion chamber 5 and mixed with fuel before being burned there.

The hot combustion gases originating from this combustion are then expanded in different turbine stages. A first expansion is accomplished in a high-pressure stage 6 immediately downstream of the combustion chamber 5 which receives the gases at the highest temperature. The gases are again expanded by being guided through the turbine stages called low-pressure stages 7.

A low-pressure 7 or high pressure 6 turbine conventionally comprises one or more stages, each being constituted of a row of fixed turbine vanes, also called distributors, followed by a row of mobile turbine blades, which form a rotor 3. The distributor 2 deflects the flow of gas collected at the combustion chamber 5 toward the movable turbine blades at an appropriate angle and speed in order to drive in rotation these mobile blades and the rotor of the turbine.

The rotor comprises several disks, for example four disks, which generally comprise peripheral grooves like sockets in which the mobile blades are interlocked.

The rotor of the turbine is subjected to a very hot thermal environment, much greater than the maximum temperatures tolerable by the parts of the rotor.

This is why the rotor generally comprises a rotating knife edge sealing ring attached to the hub of each disk, facing which is positioned a static portion having a drilling comprising an abradable material capable of resisting high temperatures, in order to reduce convective exchanges between the flow of hot air originating in the air stream and the rotor.

Ventilation specific to rotor disks has in addition been installed, comprising a flow of pressurized air collected upstream of the turbine, typically at the high-pressure compressor 4, which is introduced into the rotor for the purpose of cooling its disks, in particular its sockets.

To this end, lunules (or radial grooves) are formed circumferentially on a downstream face of the radial flange of the sealing ring, in order to bring the flow of pressurized air to the sockets through the cavity delimited by the hub of the downstream disk and the sealing ring. These lunules, which are depressions extending substantially radially with respect to the axis X of the turbomachine, are often machined into the mass of the sealing ring. As a variant, they can be machined directly into the mass of the disk. It turns out, however, that their production is painstaking and cannot be accurately controlled, so that it is necessary to over-dimension them so as to guarantee a minimum cross-section for ventilating the bottoms of the sockets.

In practice, a strong dispersion of the calibrating cross section is in fact noted, i.e. the minimal section of the lunules necessary for sufficiently ventilating the sockets, due to the geometry of the lunules and to their complex production. This dispersion can in fact reach 40% between the minimum allowable cross-section and the cross section obtained for the lunules. At present there also does not exist a simple and reliable means of control allowing verification that the cross section of the lunules is sufficient for correctly ventilating the disks.

It is therefore customary to over-dimension the cross section of the lunules by increasing the nominal cross section of the lunules so as to guarantee sufficient ventilation of the disks. However, the quantity of pressurized air collected upstream of the turbine is then much greater than necessary, which considerably reduces the performance of the turbomachine.

A ventilation system comprising through openings, formed at the connection of two adjacent disks, has therefore been proposed in document FR 3 019 584 in the Applicant's name. The dimensioning section of this ventilation system then corresponds to that of the through openings, which are easier and more accurate to produce than the lunules. This ventilation system thus allows guaranteeing sufficient ventilation for the disks while still limiting the flow of air collected for ventilation, thus improving the performance of the turbomachine.

However, during use, it turns out that this machining generates very high stresses in the disks due to the strong centrifugal and thermal forces which are likely to limit the lifetime of these parts, which are critical because they are necessary for the proper operation of the turbomachine.

SUMMARY OF THE INVENTION

One objective of the invention is therefore to propose a ventilation system of an element such as a low-pressure turbine of a machine, which does not reduce the lifetime of the rotor and does not weaken it, while still guaranteeing sufficient ventilation of these disks and by limiting the flow of air collected for this ventilation.

For this purpose, the invention proposes a rotor of a turbomachine member, for example a turbine rotor, said rotor comprising:
  a first element,
  a second element, defining with the first element a ventilation cavity, and
  a spacer, applied and attached between the first element and the second element and comprising a series of through passages configured to allow an injection of cooling fluid into the ventilation cavity.

The spacer comprises a radially external edge leading into the ventilation cavity and a radially internal edge leading to the first element, at a distance from the ventilation cavity. Each passage comprises a through opening formed in the spacer and leading to the first element at a distance from the ventilation cavity. A groove extends between the through opening and the radially external edge, a cross section of the through opening being bigger than a cross section of the groove.

Certain preferred but non-limiting features of the rotor described above are the following, taken individually or in combination:

the spacer is annular, and said spacer is applied and attached between the internal radial flange and the first element, the spacer is discontinuous and includes several sub-parts attached between the internal radial flange and the first element, the passages being obtained by leaving a space between two adjacent sub-parts, the first element comprises an annular disk comprising a hub and a rim, said rim being configured to receive the blades of the member, the second element comprises a sealing ring comprising an internal radial flange attached to the hub and an external radial flange in contact with the rim, the sealing ring defining, with the disk, the ventilation cavity of the rim, the through opening of each passage leads to the hub, at a distance from the ventilation cavity, the radially internal edge leads to the hub, the groove is a through groove, a series of lunules is formed in the second element and the spacer is attached between the first element and the second element so that the passages face said lunules, a series of lunules is formed in the internal radial flange of the sealing ring and the spacer is attached between the hub and the internal radial flange so that the passages face said lunules, the internal radial flange of the sealing ring is bent and comprises an axial portion adjacent to the external radial flange, the spacer is bent and comprises a shoulder formed to face the axial portion of the internal radial flange, and the groove of the passages extending to the shoulder of the spacer, and/or the internal radial flange comprises a series of tabs and is attached to the hub by means of said tabs, and the spacer is attached to the internal radial flange so that the passages extend between two adjacent tabs.

According to a second aspect, the invention also proposes a turbine, particularly a low-pressure turbine of a turbomachine, comprising a rotor as described above.

BRIEF DESCRIPTION OF THE DRAWINGS

Other features, aims and advantages of the present invention will appear more clearly upon reading the detailed description that follows, and with reference to the appended drawings given by way of non-limiting examples and in which.

DETAILED DESCRIPTION OF AN EMBODIMENT

Figure 1:
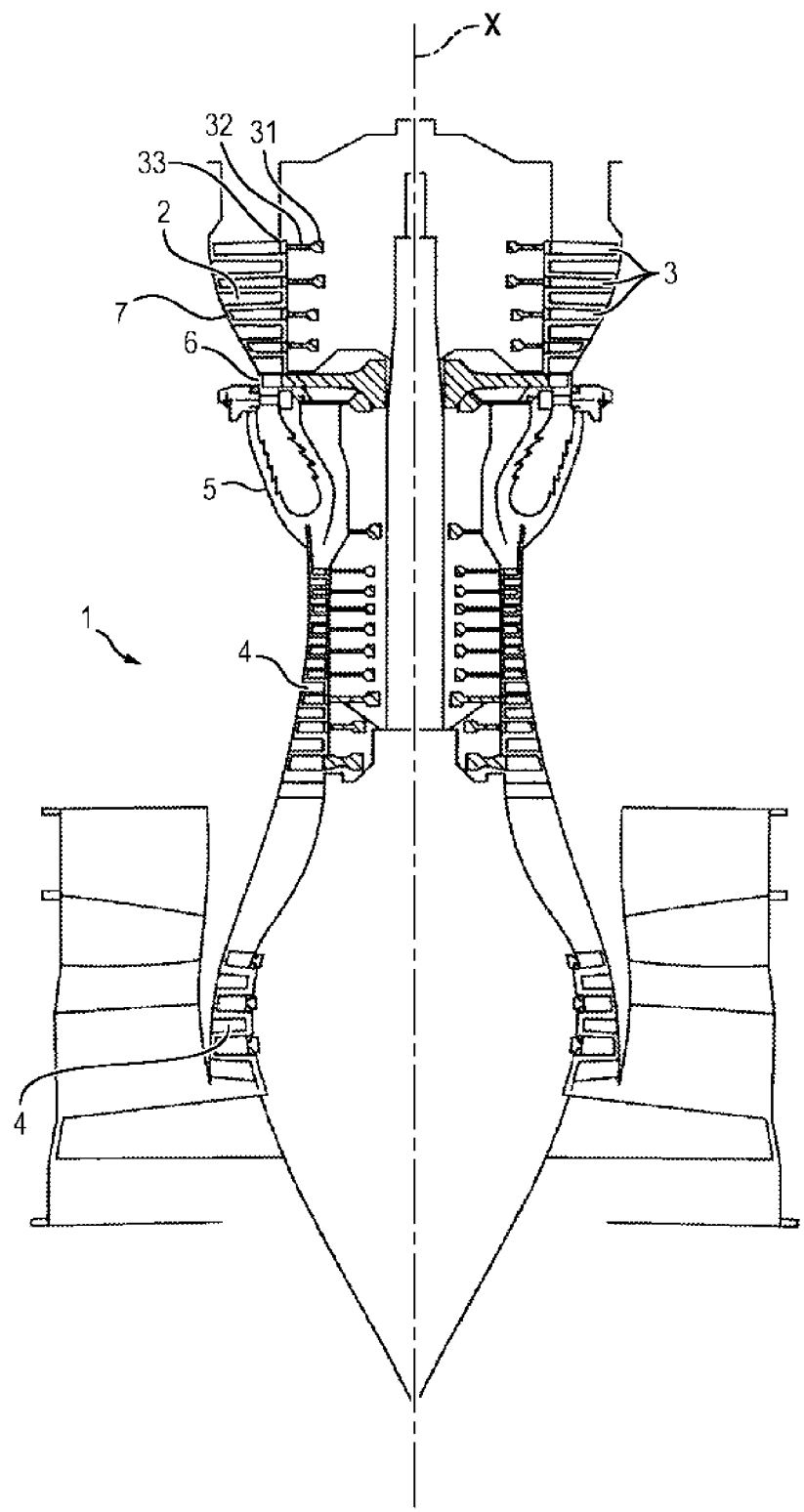
FIG. 1 shows an example of a turbomachine to which the invention applies.

The invention will be described most particularly with reference to a low-pressure turbine 7, comprising a series of distributors 2 (or stators) alternating, along the axis X of rotation of the turbomachine 1, with a series of mobile 3 disks 30 of a rotor 3. This is however not limiting, in that the turbine 7 could comprise a different number of stages, and that the invention also finds application in any rotor of a member of a turbojet comprising a first element and a second element defining with the first element a ventilation cavity, such as a rotor of a high-pressure turbine 6 which can be single or multistage or even of a high-pressure or low-pressure compressor.

The turbine 7 conventionally includes one or more stages (see FIG. 1), each consisting of a distributor 2 followed by a rotor 3 (or mobile wheel).

The rotor 3 has an axis of revolution X which corresponds to a principal axis of the turbomachine 1 and comprises several disks 30, for example four disks 30, which each comprise a hub 31 extending radially toward the interior in the direction of the axis X. Peripheral grooves such as the sockets 32, in which the mobile blades 34 are interlocked, are formed in a rim 33 of the hubs 31.

The different rotor 3 disks 30 can in particular be assembled coaxially by bolting. Each rotor 3 disk 30 can be connected to an adjacent disk 30 by means of a ferrule 36.

Figure 2:
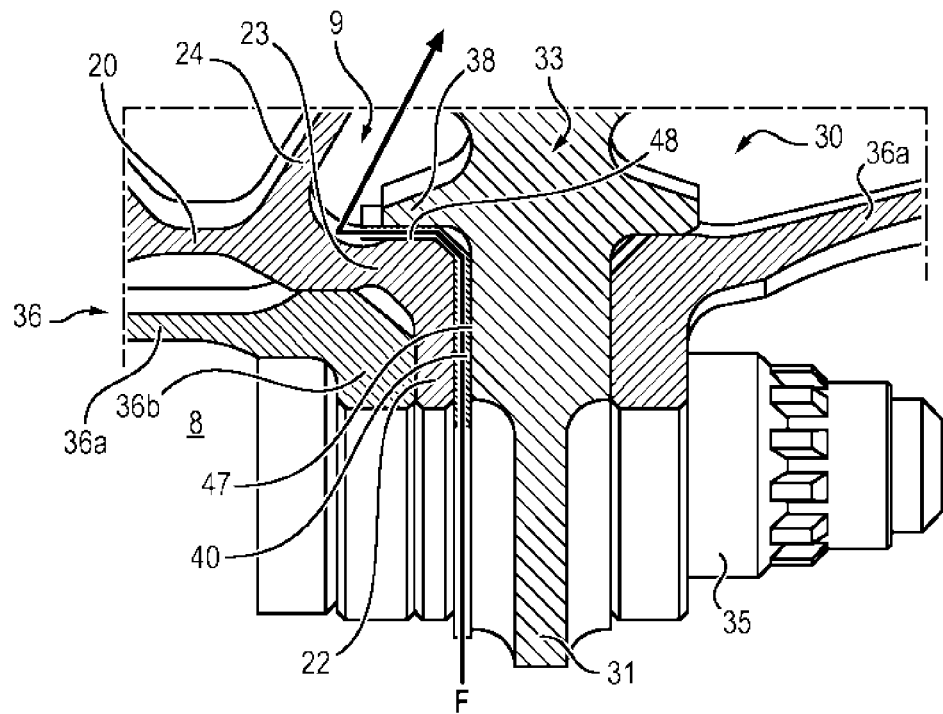
FIG. 2 is a section view of a disk of a first embodiment of a rotor conforming to the invention.
Figure 3:
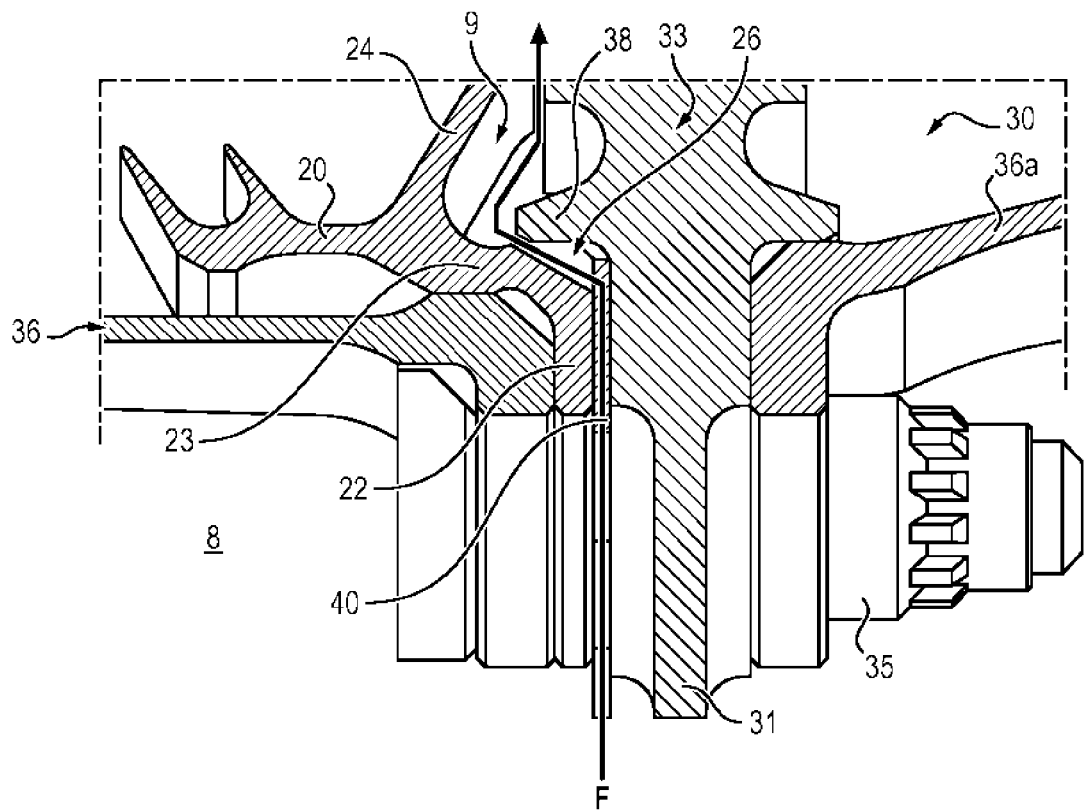
FIG. 3 is a section view of a disk of a second embodiment of a rotor conforming to the invention.

For example, as indicated in FIGS. 2 and 3, the second and the third disk 30 (in the direction of flow of the gases in the turbomachine) each include a ferrule 36 which extends from its downstream radial face and which is attached to the disk 30 immediately downstream (i.e. the third and fourth disks 30, respectively). This ferrule 36 thus delimits a radially internal cavity with the hub 31 immediately downstream. The ferrule 36 can in particular be attached by bolting.

Hereafter, the invention will be described in relation with the second and the third disk 30 of the turbine 7. However, the invention applies to all the disks 30 of a turbine 7, and more particularly to disks comprised between the first disk 30 and the last disk 30 of the turbine 7 in that these disks are all connected to the disk 30 immediately upstream by means of the ferrule 36 of this upstream disk 30.

An annular sealing ring 20 providing sealing of the cooling-air passage F of the rims 33 of the disks 30 is also attached to each disk. In one embodiment, the sealing ring 20 can also ensure a seal between the downstream side of the mobile blade and the upstream side of the fixed vane immediately upstream. To this end, for a given disk 30, the sealing ring 20 comprises an internal radial flange 22 attached to the hub 31 of the disk 30 and an external radial flange 24 in contact with the rim 33 of this disk 30. The internal radial flange 22 and the external radial flange 24 of the sealing ring 20 thus define, with this disk 30, a ventilation cavity 9 of the rim 33 of the disk 30.

The sealing ring 20 can comprise knife edges, in the conventional manner.

In the exemplary embodiment illustrated in the figures, the internal radial flange 22 of the sealing ring 20 of the third disk 30 is attached between the ferrule 36 of the second disk 30 and the hub 31 of the third disk 30.

In one embodiment, the ferrule 36 of the second disk 30 can comprise a substantially axial portion 36a with respect to the axis X, which extends toward the third disk 30 and delimits the internal cavity 8, and a radial portion 36b with respect to the axis X which corresponds to the free end of the ferrule 36 and is attached to the hub 31 of the third disk 30.

In order to ventilate the rim 33 of the disks 30 of the rotor 3, a flow of pressurized air F can be collected upstream of the turbine 7, typically at the high-pressure compressor 4 of the turbomachine 1, and be introduced into the sockets 32 of their rim 33 so as to cool the disks 30. For this purpose, the rotor 3 comprises a ventilation system for each disk 30, adapted to put into fluid communication the radially internal cavity 8 and the ventilation cavity 9.

To this end, the rotor 3 comprises an annular spacer 40, applied and attached between the internal radial flange 22 of the sealing ring 20 and the hub 31 of the disk 30 which comprises as series of through axial passages 42 configured to allow an injection of cooling fluid F into the ventilation cavity 9 starting from the radially internal cavity 8.

The passages 42 extend substantially at least partly radially with respect to the axis X from a radially internal zone (adjacent to the axis X) toward a radially external zone (which is adjacent to the rim 33, when the first element comprises a hub 30) of the annular spacer 40. The passages 52 thus form circulation channels for the cooling fluid F from the radially internal cavity 8 to the ventilation cavity 9. In fact, the attachment of the sealing ring 20 on the first element, here the hub 31, is sealed, so that the flow of pressurized air F can only follow the circulation channels thus formed.

The attachment of an applied spacer 40 thus allows precise calibration of the quantity of cooling fluid F (pressurized air) introduced into the ventilation cavity 9, the passage 42 being manufacturable, for example by machining, during a distinct step in the production of the disks 30 and without having to machine the disk 30 (or the sealing ring 20). The passages 42 therefore no longer constitute zones of weakness of the disks 30, which allows their lifetime to be increased while ensuring that they are properly cooled.

The implementation of such a spacer 40 also allows a considerably reduction in the cost of manufacture of the rotor 3, in that it allows limiting, even eliminating, the need for ventilating the rim 33 and the control of which was particularly costly. Moreover, the spacer 40 is easy to produce and for a lower cost. Finally, optionally, the spacer 40 allows adjusting the cross section of the ventilation flow at each passage 42.

The spacer 40 can for example be fixed by bolting (screw and nut system 35) on the hub 31 and the internal radial flange 22, by means of attachment holes 22c formed in said internal radial flange 22. This mode of attachment can be advantageous, particularly when the internal radial flange 22 is itself attached to the hub 31 by bolting, in which case it is sufficient to interleave the spacer 40 between the internal radial flange 22 and the hub 31.

As a variant, the spacer 40 can be attached by an interference fit, screwing, clamping, etc.

Figure 6:
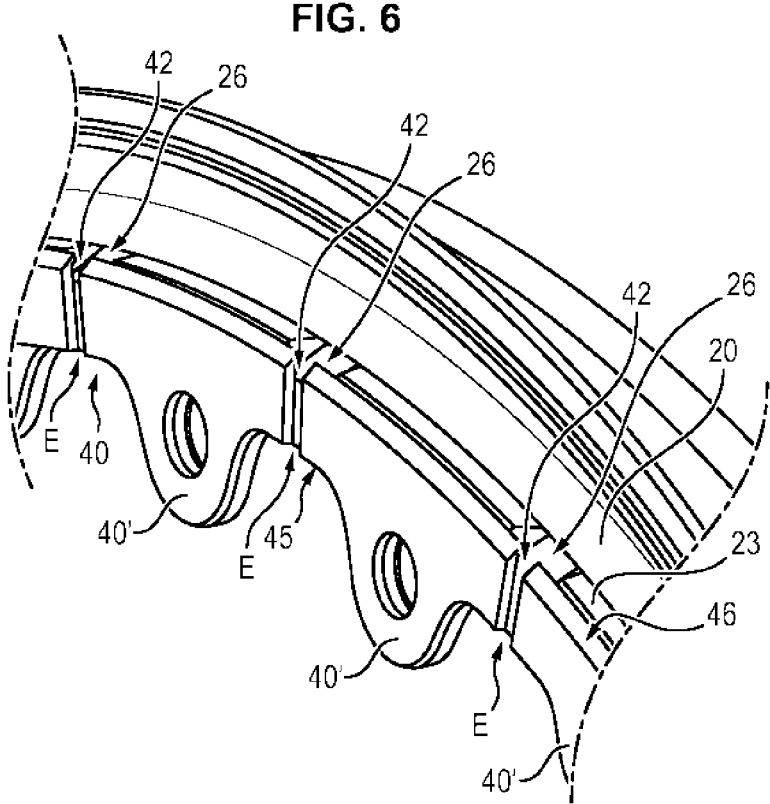

As illustrated in FIG. 6, in a first embodiment the spacer 40 can be discontinuous and comprise several sub-parts 40' which are individually attached between the internal radial flange 22 of the sealing ring 20 and the hub 31, typically at each bolting point. In this case, the sub-parts 40' are attached so as to provide a space E between two adjacent sub-parts 40', said spaces E defining the passages 42 for the injection of the cooling fluid F from the radially internal cavity 8 into the ventilation cavity 9. The sub-parts 40' can have identical shapes and sizes, or as a variant be distinct so as to adjust, on a case by case basis, the desired ventilation flow rates.

Figure 4:
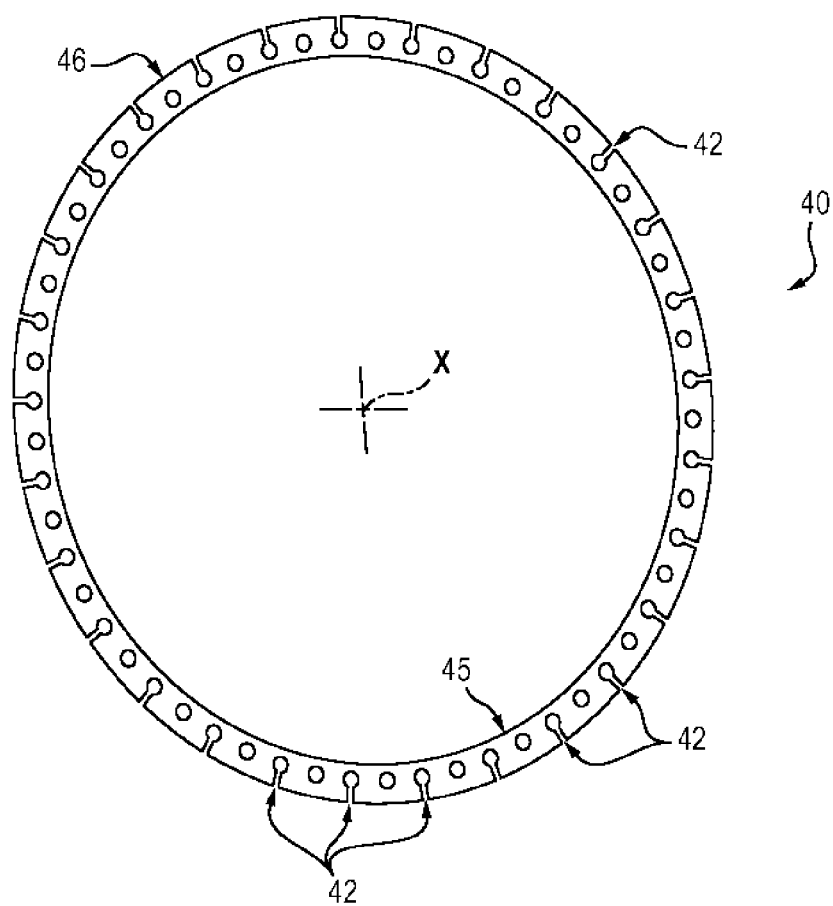
FIG. 4 is a perspective view of an embodiment of a 360° spacer which can be used in the rotor of FIG. 3.
Figure 5A:
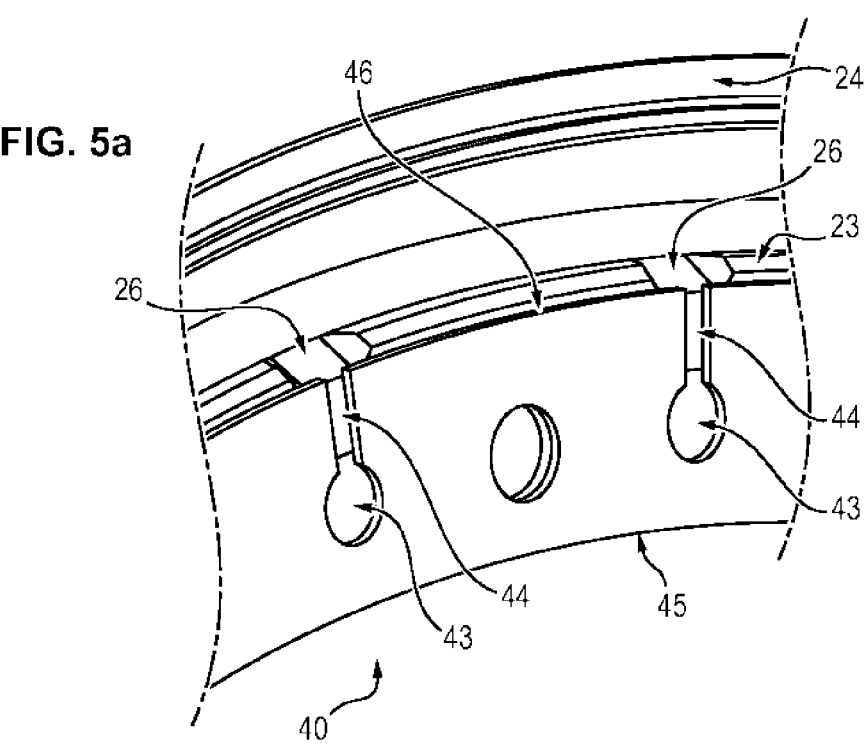
FIG. 5a is a partial perspective view of the spacer of FIG. 4, positioned on an example of a sealing ring, seen from the downstream face of the spacer.
Figure 5B:
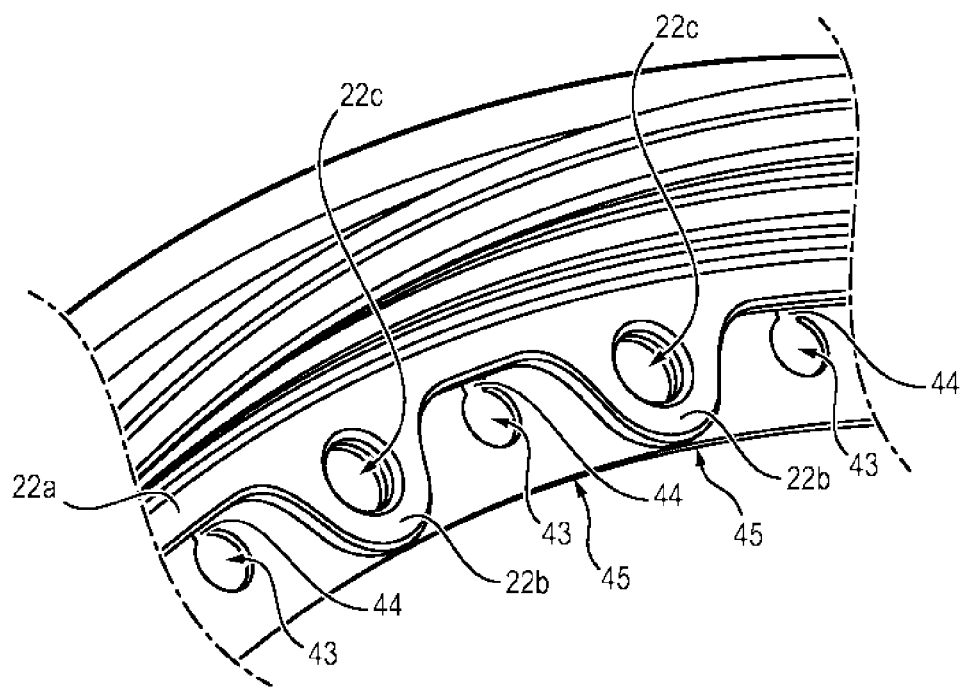
FIG. 5b is a view from the upstream face of the assembly of FIG. 5a, and FIG. 6 is a perspective view of another embodiment of a space in an angular sector smaller than 360°, positioned on an example of a sealing ring.

As a variant, in a second embodiment illustrated in FIG. 4, the spacer 40 can be continuous, i.e. a single part and, if appropriate, formed as a single piece (as illustrated in particular in FIGS. 4, 5a and 5b). In this case, the passages 42 are formed in the spacer 40, for example by machining, drilling, etc.

Each passage 42 can comprise, as illustrated in FIG. 5a, an axial through opening 43, formed in the spacer 40 and leading into the internal cavity 8, i.e. at the hub 31 and at a distance (radially toward the axis X of the rotor) from the ventilation cavity 9, and a groove 44, extending substantially radially with respect to the axis X from the opening 43 and leading into the ventilation cavity 9.

More precisely, the spacer 40 comprises a radially external edge 46 leading into the ventilation cavity 9 and a radially internal edge 45 leading into the internal cavity 8, at the hub 31. The through openings 43 are then formed at a distance from the two edges 45, 46 while the groove 44 is formed between the opening 43 and the radially external edge 46.

The cross section of the groove 44 is selected so as to allow sufficient ventilation of the disks 30 of the rotor 3 by collecting a minimum flow of air upstream of the turbine 7 so as not to penalize the efficiency of the turbomachine. Consequently, it is the cross section of the grooves 44 which is dimensioning (calibrating). The cross section of the openings 43 is simply selected so as to be greater than the cross section of the grooves 44, in order to ensure a sufficient collection of cooling fluid F in the internal cavity 8. Furthermore, optionally, the cross section can also be selected so as to remain smaller than the cross section of the holes in the facing internal radial flange 22 so as to limit the risks of error during assembly of the screws into the holes. Thus, an opening 43 of which the cross section is less can serve as a mistake-proofer. The openings 43 also allow a reduction of the stresses. In fact, these openings 43 correspond to discharge holes. Due to their radius, they also allow a reduction of the tangential mechanical stresses (preponderant in a rotating part) which circulate in the spacer 40 by progressively deflecting the stress flow. In fact, in the case of a sudden edge break, the flow is deflected very rapidly, which generates considerable mechanical stresses, harmful to the lifetime of the part. It will be noted that such shapes are present, particularly in the embodiment of FIG. 4, in which the spacer 40 is a continuous single-piece part over 360°. These openings 43, on the other hand, are not necessary if the spacer 40 conforms to the embodiment illustrated in FIG. 6.

The cross section of the grooves 44 is selected depending on the corresponding stage of the disk 30 (second disk 30, third disk 30, etc.), on the temperature of the turbine 7, on the flow rate of the air stream through the turbomachine, etc. this selection being part of the general work of a person skilled in the art, it will not be further detailed here.

The cross section of the grooves 44 can be rectangular. Such a section is in face easy to produce in comparison with lunules which have radii that are difficult to machine and to reproduce. Furthermore, the groove 44 can comprise only a recess (simple groove 44) or be composed of several recesses, parallel or not (multiple groove 44).

The through openings 43 can have a circular cross section. In fact, it turns out to be easy at present to control the cross section of an opening when it is circular, in that it is sufficient to determine its diameter.

This is not limiting, however, the grooves 44 and the through openings 43 being able to have different cross sections (triangular, oval, or any other section shape).

The groove 44 can be of the through type or, as a variant, be blind.

Optionally, the internal radial flange 22 of the sealing ring 20 can comprise a substantially annular strip 22a (FIG. 5b) from which extend a series of tabs 22b or lugs used for the attachment of the sealing ring 20 to the hub 31. The strip 22a and the tabs 22b are, in one embodiment, single piece and made of a single part. The sealing ring 20 can be bolted to the hub 31, in which case each tab 22b comprises a through hole 22c configure to receive one shank of this attachment system.

The spacer 40 can then be attached to the disk 30, between the internal radial flange 22 and the hub 31, so that each opening 43 of a passage 42 is located between two adjacent tabs 22b. In this exemplary embodiment, the openings 43 of the passages 42 therefore lead from the two sides into the internal cavity 8.

In the exemplary embodiment illustrated in the figures, the sealing ring 20 comprises, between the external radial flange 24 and the internal radial flange 22, a substantially axial flange 23 which forms an elbow with the internal radial flange 22. Furthermore, the hub 31 comprises, at this axial flange 23, an annular protrusion 38 which faces (FIG. 2) and rests against (FIG. 3) said axial flange 23.

In this case, the spacer 40 also comprises a bent portion 48 of which the shape and the dimensions correspond respectively to the shape and to the dimensions of the bend of the sealing ring 20, so as to take on the shape of the internal radial flange 22 and of the axial flange 23 and to cover at least partly the axial flange 23. This configuration thus allows the introduction of the cooling fluid F into the ventilation cavity 9 despite the presence of the annular protrusion 38 of the hub 31 (see FIGS. 2 and 3). To this end, the spacer 40 can comprise an annular plate 47, attached along the internal radial flange 22, and a shoulder 48 extending from the annular plate 47 so as to face the axial flange 23. The radially external edge 46 of the spacer 40 then corresponds to the edge of the shoulder 48 and extends facing the radially external surface of the axial flange 23 so that the passage 42 actually leads into the ventilation cavity 9. Thus, in the case where the passage 42 comprises a groove 44, said groove 44 can be formed in the annular plate 47 and in the shoulder 48 of the spacer 40 and extend, if appropriate, until its edge 46.

Optionally, lunules 26 (FIGS. 3 and 5a), participating in the injection of cooling fluid F into the ventilation cavity 9, can also be formed in the sealing ring 20, more precisely in a portion of the sealing ring 20 which faces the spacer 40.

These lunules 26 can then have a larger cross section than the cross section of the passage 42 of the spacer 40, thus increasing their manufacturing tolerance. It is then the cross section of the passages 42 formed in the spacer 40 which is dimensioning (or calibrating) for the quantity of cooling fluid F injected into the ventilation cavity 9, via the lunules 26. The cross section of the lunules 26 can then be selected so as to be greater than the cross section of the passages 42, so as to being the flow of pressurized air F from the passages 42 to the ventilation cavity 9.

The lunules 26 are formed in the downstream face of the internal radial flange 22 (FIG. 5a).

When the sealing ring 20 comprises an axial flange 23, the lunules 26 can also be formed in the axial flange 23 so as to lead into the ventilation cavity 9 and to allow the passage 42 of the cooling fluid F.

In this case, the spacer 40 can either extend only along the internal radial flange 22 and be substantially flat, or comprise a bent portion (shoulder 48) with a shape corresponding the shape of the bend of the sealing ring 20.

The lunules 26 can be obtained by milling in the mass of the internal radial flange 22 (and if appropriate of the axial flange 23).

The spacer 40 can comprise an anti-rotation abutment, configured to prevent the spacer 40 (or the spacer 40 sub-parts 40') from rotating during the operation of the rotor 3. For example, in the case where the spacer 40 comprises a shoulder 48, said shoulder 48 allows the radial movements of the spacer 40 to be limited and thus forms an anti-rotation abutment.

Optionally, the spacer 40 can have one or more of the following features:

Supplementary machining can be applied to the spacer 40 so as to satisfy mass gain objectives.

Scallops or any other shape configured to reduce stresses within the spacer 40 can be formed with the spacer 40, The passages 42 can have, within the same spacer 40, different cross sections so as to modify the quantity of air injected into the ventilation cavity 9 depending on their angular position around the axis X of the rotor 3. Such a configuration can prove worthwhile for example when the distribution of attachment bolts 20 of the sealing ring 30 on the hub 31 is heterogeneous or if the ventilation specifications of the rotor 3 change.

The spacer 40 can have multiple stages, i.e. comprise several plates placed one against the other so as to overlap.

The spacer 40 can be thin and have a thickness on the order of 1 mm when it is made of a nickel-based super-alloy type of material. It is then easy to insert between the radial flange and the hub 31, takes little space and does not penalize the overall mass of the rotor 3.

It will be noted that the ventilation spacer 40 of the invention can be applied to other parts of a turbomachine requiring calibrated ventilation, and is not limited in its application to a rotor of a turbine.

The invention claimed is:

1. A rotor of a member of a turbomachine comprising:
a first element,
   a second element defining with the first element a ventilation cavity, and
   a spacer, applied and attached between the first element and the second element and comprising a series of through passages configured to allow an injection of cooling fluid into the ventilation cavity,
   wherein the spacer comprises a radially external edge leading into the ventilation cavity and a radially internal edge leading to the first element, at a distance from the ventilation cavity,
   wherein each passage comprises a through opening formed in the spacer and leading to the first element at a distance from the ventilation cavity, and a groove extending between the through opening and the radially external edge, a cross section of the through opening being bigger than a cross section of the groove,
   wherein the first element comprises an annular disk comprising a hub and a rim, said rim being configured to receive blades of the member,
   wherein the through opening of each through passage leads to the hub, at a distance from the ventilation cavity,
   wherein the radially internal edge leads to the hub,
   wherein the second element comprises a sealing ring comprising an internal radial flange attached to the hub and an external radial flange in contact with the rim, the sealing ring and the disk defining the ventilation cavity, wherein the internal radial flange of the sealing ring is bent and comprises an axial portion adjacent to the external radial flange
   wherein the spacer is bent and comprises a shoulder configured to face the axial portion of the internal radial flange, and wherein the groove of the passage extends to the shoulder of the spacer.

2. The rotor according to claim 1, wherein the internal radial flange comprises a plurality of tabs and is attached to the hub with said tabs, and wherein the spacer is attached to the internal radial flange so that the through passages extend between two adjacent tabs.

3. A turbine comprising fixed turbine vanes and a rotor according to claim 1.

4. The turbine of claim 3, comprising a low-pressure turbine.

5. A turbomachine comprising the turbine of claim 3.

6. The rotor according to claim 1, wherein the spacer is annular, and wherein said spacer is applied and attached between the internal radial flange of the second element and the first element.

7. The rotor according to claim 1, wherein the spacer is discontinuous and includes several sub-parts attached between the internal radial flange of the second element and the first element, the through passages being obtained by leaving a space between two adjacent sub-parts.

8. The rotor according to claim 1, wherein the groove is a through groove.

9. The rotor according to claim 1, wherein a series of lunules is formed in the second element and the spacer is attached between the first element and the second element so that the through passages face said lunules.

10. The rotor according to claim 1, wherein a series of lunules is formed in the internal radial flange of the sealing ring and the spacer is attached between the hub and the internal radial flange so that the through passages face said lunules.

* * * * *